United States Patent
Curry et al.

(10) Patent No.: US 10,756,663 B2
(45) Date of Patent: *Aug. 25, 2020

(54) HVAC CONTROLLER THAT PROVIDES MULTIPLE TYPES OF PROPORTIONAL MOTOR CONTROL SIGNALS, AN HVAC SYSTEM THAT INCLUDES THE SAME AND A PROPORTIONAL CONTROL SIGNAL CIRCUIT

(71) Applicant: Lennox Industries Inc., Richardson, TX (US)

(72) Inventors: Jimmie Curry, Carrollton, TX (US); Darko Hadzidedic, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/959,444

(22) Filed: Apr. 23, 2018

(65) Prior Publication Data

US 2018/0241335 A1    Aug. 23, 2018

Related U.S. Application Data

(63) Continuation of application No. 14/667,168, filed on Mar. 24, 2015, now Pat. No. 9,979,343.

(51) Int. Cl.
| | |
|---|---|
| *H02P 27/08* | (2006.01) |
| *G05D 23/19* | (2006.01) |
| *H02P 7/06* | (2006.01) |
| *F24F 11/63* | (2018.01) |
| *F24F 11/77* | (2018.01) |

(52) U.S. Cl.
CPC .......... *H02P 27/08* (2013.01); *G05D 23/1919* (2013.01); *H02P 7/06* (2013.01); *F24F 11/63* (2018.01); *F24F 11/77* (2018.01); *Y02B 30/746* (2013.01)

(58) Field of Classification Search
CPC .......... F24F 11/0079; F24F 2011/0061; G05D 23/1919; H02P 27/08; H02P 7/06
See application file for complete search history.

(56) References Cited

U.S. PATENT DOCUMENTS

| | | | | |
|---|---|---|---|---|
| 5,492,273 | A * | 2/1996 | Shah | H02P 6/085 236/44 A |
| 8,295,510 | B2 | 10/2012 | Lin | |
| 8,324,824 | B2 | 12/2012 | Lin et al. | |
| 2005/0264253 | A1* | 12/2005 | Ivankovic | B60H 1/00428 318/685 |
| 2010/0070085 | A1* | 3/2010 | Harrod | G05B 19/042 700/276 |

(Continued)

*Primary Examiner* — Chad G Erdman
(74) *Attorney, Agent, or Firm* — Winstead PC

(57) ABSTRACT

The disclosure provides a proportional control signal circuit (PCSC), an HVAC controller employing the same and an HVAC system including the HVAC controller. In one embodiment, the PCSC includes: (1) a signal input configured to receive a pulse width modulated signal, (2) a control input configured to receive an integration signal, (3) a signal output and (4) control circuitry, coupled to the signal input, the control input and the signal output, configured to provide either the pulse width modulated signal or a DC signal to the signal output based on the integration signal.

18 Claims, 2 Drawing Sheets

(56) References Cited

U.S. PATENT DOCUMENTS

| | | | |
|---|---|---|---|
| 2014/0133202 A1* | 5/2014 | Tamaoka | H02M 1/4225 |
| | | | 363/74 |
| 2015/0207397 A1 | 7/2015 | Koehler et al. | |
| 2015/0227125 A1* | 8/2015 | Matsushita | H02P 7/2805 |
| | | | 273/460 |
| 2015/0256070 A1* | 9/2015 | Lee | H02P 7/08 |
| | | | 323/283 |

* cited by examiner

HVAC CONTROLLER THAT PROVIDES MULTIPLE TYPES OF PROPORTIONAL MOTOR CONTROL SIGNALS, AN HVAC SYSTEM THAT INCLUDES THE SAME AND A PROPORTIONAL CONTROL SIGNAL CIRCUIT

CROSS-REFERENCE TO RELATED APPLICATION

This application is a continuation of U.S. patent application Ser. No. 14/667,168 filed on Mar. 24, 2015. U.S. patent application Ser. No. 14/667,168 is incorporated herein by reference.

TECHNICAL FIELD

This application is directed, in general, to controllers or control boards, such as for heating, ventilating and air conditioning (HVAC) systems, and, more specifically, to reducing the number of dedicated connectors on a control board.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying or dehumidifying the air). To direct operations of the circulation fan and other components, each HVAC system includes at least one HVAC controller. Traditionally, the circulation fans in HVAC system were single speed fans that operate in response to an on/off signal from the controller. Some HVAC systems, however, include a variable-speed circulation fan that is controlled by a pulse width modulated signal (PWM) from the HVAC controller.

SUMMARY

The disclosure provides a proportional control signal circuit (PCSC) for operating a motor. In one embodiment, the PCSC includes: (1) a signal input configured to receive a pulse width modulated signal, (2) a control input configured to receive an integration signal, (3) a signal output and (4) control circuitry, coupled to the signal input, the control input and the signal output, configured to provide either the pulse width modulated signal or a DC signal to the signal output based on the integration signal.

In another aspect, the disclosure provides a controller for a heating, ventilating and air conditioning (HVAC) system of an enclosed space. In one embodiment, the HVAC controller includes: (1) a data reservoir configured to store descriptive data about the HVAC system. (2) a signal generator configured to provide a pulse width modulated signal to control a device of the HVAC system, and (3) a signal manager configured to generate an integration signal, based on the descriptive data, to control the pulse width modulated signal.

In yet another aspect, the disclosure provides an HVAC system of an enclosed space. In one embodiment, the HVAC system includes: (1) a motor controller for a motor and (2) an HVAC controller configured to provide a proportional motor control signal for the motor controller. The HVAC controller including: (2A) a processor configured to provide a pulse width modulated signal to control the motor and an integration signal, based on descriptive data of the HVAC system, to control the pulse width modulated signal and (2B) a proportional control signal circuit (PCSC) having a signal input configured to receive the pulse width modulated signal, a control input configured to receive the integration signal, a signal output, and control circuitry, coupled to the signal input, the control input and the signal output, configured to provide, based on the integration signal, to the signal output either the pulse width modulated signal or a DC signal as the proportional motor control signal.

BRIEF DESCRIPTION

Reference is now made to the following descriptions taken in conjunction with the accompanying drawings, in which.

DETAILED DESCRIPTION

While some variable-speed motors are controlled by a PWM signal, other variable-speed motors that are used in HVAC systems operate based on a DC signal. As such, there could be different types of control signals needed from an HVAC controller depending on the variable-speed motor that is used to, for example, control a circulation fan. It is realized herein the advantage of employing a single controller or control board for HVAC systems that can be used for either type of variable-speed motor. Thus, a company can manufacture a single control board that can be used with multiple types of HVAC systems. It is further realized, however, that using such a universal controller can require two different types of proportional control signals, dedicated circuitry for the two types of control signals and dedicated connectors on the control board. As such, the flexibility of such a controller also comes with additional costs.

Accordingly, disclosed herein is a proportional control signal circuit (PCSC) that receives one type of proportional control signal and provides two different types of proportional motor control signals therefrom. For example, the received control signal can be a PWM signal and the two control signals can be the PWM signal and a DC voltage signal. The disclosed integrated circuits advantageously provide a universal controller without requiring dedicated connectors for the different type of proportional motor control signals. The disclosure further provides an HVAC controller that can provide either a PWM or a DC proportional control signal at a single output connector to be used with the different types of variable-speed motors of an HVAC component. The HVAC component, for example, can be a circulation fan.

Figure 1:
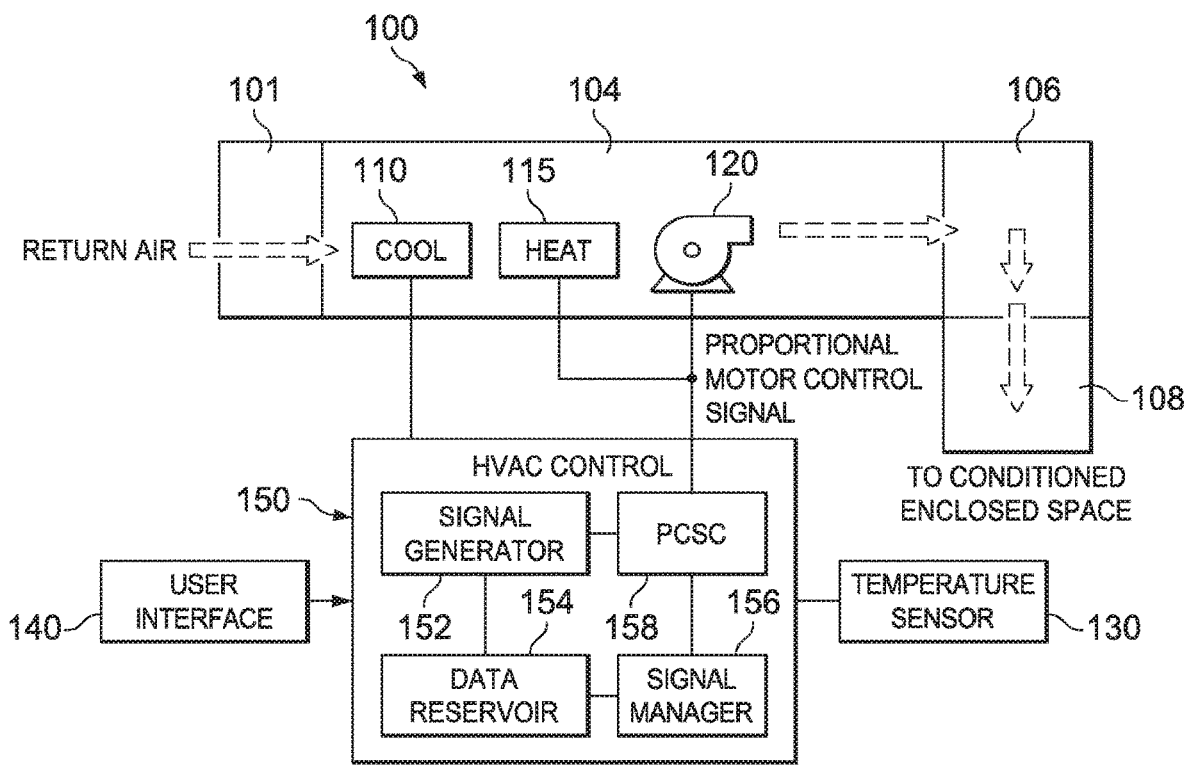
FIG. 1 illustrates a diagram of an embodiment of a HVAC system constructed according to the principles of the disclosure.

Turning now to FIG. 1, illustrated is a block diagram of an embodiment of a HVAC system 100 constructed according to the principles of the disclosure. The HVAC system 100 includes a return duct 101, a return plenum 104, a supply duct 106 and a supply plenum 108. Additionally, the HVAC system 100 includes conditioning systems for cooling and heating air in the enclosed space. The conditioning systems include a cooling system or cooling source 110 and a heating system or heating source 115. The cooling system 110 can include a refrigeration circuit having a compressor system, evaporator coils and condenser coils fluidly coupled together. The cooling system 110 has multiple cooling stages. Given the teachings herein, one skilled in the art will understand that this disclosure applies to HVAC embodiments having one or more than one cooling stage. The heating system 115 can include a gas furnace, electric heating elements, or even a combination thereof. The heating system 115 can also be multi-staged or a single staged system.

The HVAC system 100 also includes a circulation fan 120, a temperature sensor 130, a user interface 140 and an HVAC controller 150. Given the teachings herein, one skilled in the art will also understand that the HVAC system 100 may include additional components and devices that are not presently illustrated or discussed but are typically included in an HVAC system, such as, a humidity sensor, a filter, a power supply, etc. Some of illustrated components of the HVAC system 100 may be contained within a single enclosure (e.g., a cabinet). In one embodiment, the HVAC system 100 is a rooftop unit. The HVAC system 100 can be another type of commercial HVAC system or a residential system.

The cooling system 110, the heating system 115 and the circulation fan 120, sometimes referred to as an indoor air blower, may be conventional devices that are typically employed in HVAC systems. The circulation fan 120 may be a variable-speed fan. Depending on the installation, the circulation fan 120, or the motor of the circulation fan is controlled by a PWM control signal or a DC control signal. Typically, the circulation fan 120 includes a motor controller (not shown) that receives a proportional motor control signal from the HVAC controller 150 to direct operation of the circulation fan 120. The proportional motor control signal is either a PWM signal or a DC signal. Thus, the HVAC controller 150 can be used in an HVAC system having either type of variable-speed motor. Advantageously, this can be done without altering circuitry for specific installations or having particular output connectors for the two different types of control signals.

The temperature sensor 130 is configured to sense the temperature within the enclosed space and send the sensed temperature to the HVAC controller 150. The HVAC controller 150 receives the sensed temperature and directs operation of the HVAC system employing the sensed temperature input. The temperature sensor 130 can be a thermostat that senses temperature, receives user inputs, and generates thermostat calls. In one embodiment, the temperature sensor 130 and the user interface 140 are an integrated device. In some embodiments, the temperature sensor 130, the user interface 140 and the HVAC controller 150 are a single HVAC device.

The user interface 140 is configured to be an interface between a user and the HVAC system 100. The user interface 140 can be an HVAC device that has a primary function of communicating between the HVAC system 100 and the user. In some embodiments, the user interface 140 can be a non-HVAC device, such as a smart phone, that includes an application which allows communication between with the HVAC system 100. There may be multiple user interfaces 140 for the HVAC system 100. In some embodiments, the temperature sensor 130 and the user interface 140 are also conventional HVAC devices.

As such, in one embodiment, the user interface 140 includes the temperature sensor 130, a message screen and an alarm annunciator (such as a bell, a public-address speaker, a telephone message generator, or a computer network gateway), is coupled to the HVAC controller 150 and configured to allow a user to select a set point indoor temperature and perhaps a system operational mode (i.e., air conditioning, heating or ventilation) and also display information about the HVAC system 100, including providing alarms and other messages.

The HVAC controller 150 may include a processor, such as a microprocessor, configured to direct the operation of the HVAC system 100. Additionally, the HVAC controller 150 may include an interface and a memory coupled thereto. The interface may include multiple ports or connectors for transmitting and receiving external data and data from at least other components or devices of the HVAC system 100, such as the cooling system 110, the heating system 115 and the circulation fan 120. The memory section may be a conventional memory that is constructed to store data, such as descriptive data of the HVAC system, and computer programs.

As illustrated in FIG. 1, the HVAC controller 150 is coupled to the various components of the HVAC system 100. In some embodiments, the connections to all of the components there between are through a wired-connection. A conventional cable and contacts may be used to couple the HVAC controller 150 to the various components of the HVAC system 100 via a controller interface. In some embodiments, a wireless connection may also be employed to provide some of the connections.

The HVAC controller 150 is configured to provide a proportional motor control signal to the circulation fan 120. The proportional motor control signal can be a PWM control signal or a DC control signal. The HVAC controller 150 includes a single output connector (not shown) that is dedicated to connect to the circulation fan 120 and provide the proportional motor control signal regardless if a PWM or DC control signal is required.

The HVAC controller 150 includes a signal generator 152, a data reservoir 154, a signal manager 156 and a PCSC 158. The signal generator 152 is configured to provide a PWM signal to control the circulation fan 120. The signal generator 152 can be part of a conventional processor of an HVAC controller that is used to generate PWM signals as directed in response to HVAC programs, user inputs and environmental data of the enclosed space, such as a sensed temperature.

The data reservoir 154 is configured to store descriptive data about the HVAC system 100. The data reservoir 154 may be stored in a conventional memory of the HVAC controller 150. In one embodiment, the data reservoir 152 is stored as a table in a memory of the HVAC controller 150. In some embodiments, the data reservoir 154 is scalable. The descriptive data identifies the type of HVAC system 100 and the various components of the HVAC system 100. For example, the descriptive data includes model numbers, configuration numbers and identification numbers of the components of the HVAC system 100.

The signal manager 156 is configured to generate an integration signal, based on the descriptive data, to control the PWM signal generated by the signal generator 152. The signal manager 156 is configured to analyze the descriptive data to determine if the proportional motor control signal for the circulation fan 120 should be a PWM signal or a DC voltage signal. In one embodiment, the descriptive data includes a model number of the circulation fan 120 or a motor of the circulation fan 120 that dictates the required proportional motor control signal. The model number can be assigned during manufacturing. The model number can also be used to indicate a frequency or frequencies of the PWM signal that is generated by the signal generator 152.

The PCSC 158 is configured to receive both the PWM signal from the signal generator 152 and the integration signal from the signal manager 156. Based on the integration signal, the PCSC 158 is configured to provide the PWM signal as the proportional motor control signal for the circulation fan 120 or provide a proportional motor control signal that is a DC voltage signal. In one embodiment, a voltage of the DC motor control signal is determined by a duty cycle of the PWM signal.

Figure 2:
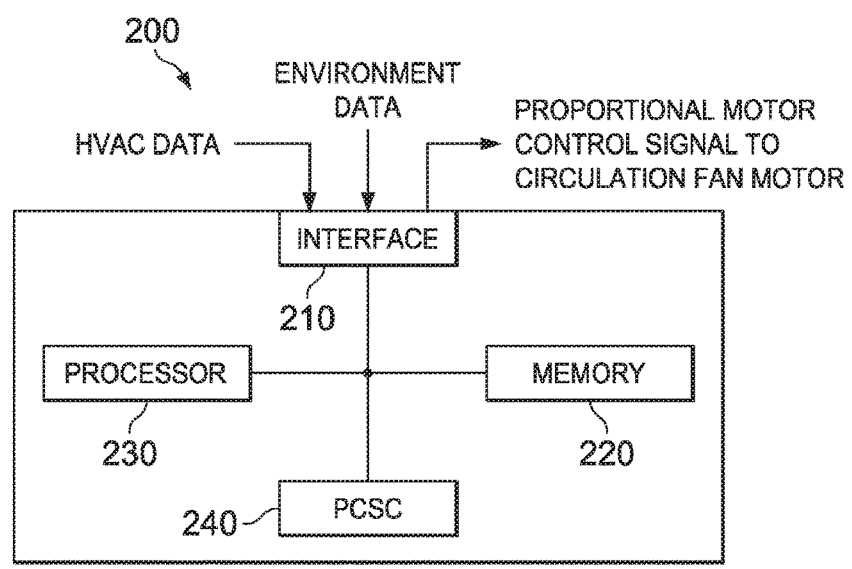
FIG. 2 illustrates a block diagram of an embodiment of a controller constructed according to the principles of the disclosure.
Figure 3:
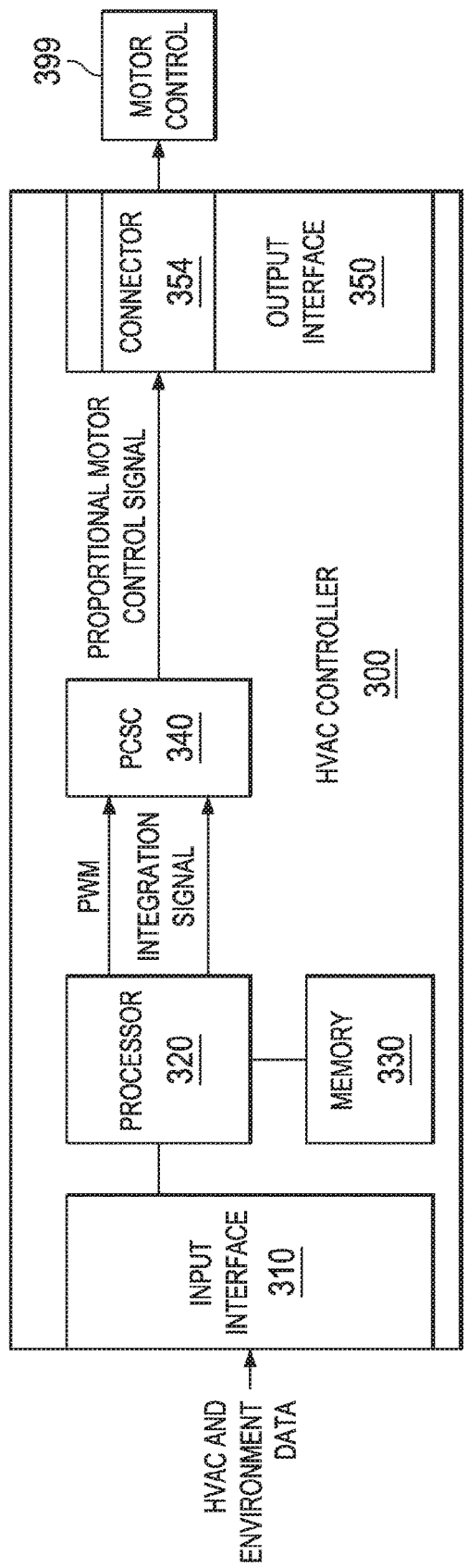
FIG. 3 illustrates another block diagram of an embodiment of a controller constructed according to the principles of the disclosure.
Figure 4:
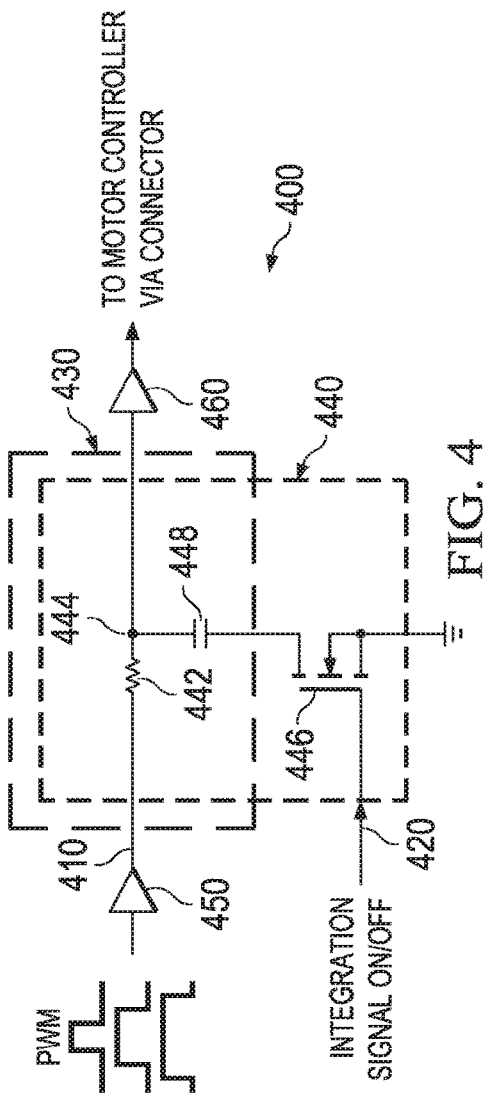
FIG. 4 illustrates a schematic diagram of an embodiment of a proportional control signal circuit constructed according to the principles of the disclosure.

FIG. 4 provides additional information of the configuration of an embodiment of a PCSC as disclosed herein and FIGS. 2 and 3 provide additional information of an HVAC controller as disclosed herein.

Turning now to FIG. 2, illustrated is a block diagram of an embodiment of HVAC controller 200 constructed according to the principles of the disclosure. The HVAC controller 200 includes an interface 210, a processor 230, a memory 220 and a PCSC 240. The interface 210, the processor 230, the memory 220 and the PCSC 240 can be connected together via conventional means. In one embodiment, the interface 210, the processor 230, the memory 220 and the PCSC 240 are each located on one control board of the HVAC controller 200. The control board can be a general purpose control board for an HVAC system, such as the HVAC system 100.

The interface 210 is configured to receive and transmit data for the HVAC controller 200. The interface 210 provides a physical connection between the HVAC controller 200 and components of the HVAC system connected thereto. The interface 210 is configured to receive signals indicating conditions or events or other data associated with the HVAC system. The signals may be associated with a sensed temperature of the enclosed space, temperature inputs, program inputs, thermostat calls, etc. The interface 210 can be a conventional interface that is used to receive and transmit data for a controller, such as a micro-controller. The interface 210 can include multiple ports, terminals or connectors for receiving or transmitting the data. The ports, terminals or connectors may be conventional receptacles for communicating data via a communications network or HVAC data bus.

The memory 220 may be a conventional memory typically located within an HVAC controller that is constructed to store data and computer programs. The memory 220 includes a data reservoir configured to store descriptive data about the HVAC system. The memory 220 may store operating instructions to direct the operation of the processor 230 when initiated thereby. The operating instructions may correspond to algorithms that provide the functionality of the operating schemes disclosed herein. For example, the operating instructions may correspond to the algorithm or algorithms that determine an integration signal based on the descriptive data. In one embodiment, the memory 220 or at least a portion thereof is a non-volatile memory.

The processor 230 is configured to operate the HVAC system in one of a plurality of conditioning modes, such as a heating mode and a cooling mode, based on, for example, environment data of an enclosed space and data of the HVAC system. The processor 230 may a microprocessor.

The processor 230 is configured to generate a PWM signal that is employed to control a device of the HVAC system, such as a circulation fan. In one embodiment, the memory 220 or a portion thereof is part of the processor 230.

The PCSC 240 is configured to receive a PWM signal and an integration signal from the processor 230 and provide a proportional motor control signal based thereon. The proportional motor control signal, either a PWM motor control signal or a DC voltage motor control signal, is provided to the interface 210 for transmission to a motor controller of the HVAC system. The motor controller can be for a circulation fan motor of an HVAC system.

Turning now to FIG. 3, illustrated is a block diagram of an embodiment of HVAC controller 300 constructed according to the principles of the disclosure. The HVAC controller 300 includes an input interface 310, a processor 320, a memory 330, a PCSC 340 and an output interface 350. The input interface 310, the processor 320, the memory 330, the PCSC 340 and the output interface 350 can be connected together via conventional means. In one embodiment, the input interface 310, the processor 320, the memory 330, the PCSC 340 and the output interface 350 are each located on one control board 301 of the HVAC controller 300, as indicated by the dashed line. The control board can be a general purpose control board for an HVAC system, such as the HVAC system 100. One skilled in the art will understand that the HVAC controller 300 can include additional components, such as additional operating boards, typically included with a controller of an HVAC system.

The input interface 310 is configured to receive data for the HVAC controller 300. The input interface 310 is configured to receive signals indicating conditions or events or other data associated with the HVAC system. The signals may be associated with a sensed temperature of the enclosed space, temperature inputs, program inputs, thermostat calls, etc. The input interface 310 can be a conventional interface that is used to receive and transmit data for a controller, such as a micro-controller. The input interface 310 can include multiple ports, terminals or connectors for receiving data. The ports, terminals or connectors may be conventional receptacles for communicating data via a communications network or HVAC data bus.

The memory 320 may be a conventional memory typically located within an HVAC controller that is constructed to store data and computer programs. In one embodiment, the memory 320 includes a data reservoir configured to store descriptive data about the HVAC system. The memory 320 may store operating instructions to direct the operation of the processor 330 when initiated thereby. The operating instructions may correspond to algorithms that provide the functionality of the operating schemes disclosed herein. For example, the operating instructions may correspond to the algorithm or algorithms that determine an integration signal based on the descriptive data. In one embodiment, the memory 320 or at least of portion thereof is a non-volatile memory.

The processor 330 is configured to operate the HVAC system in one of a plurality of conditioning modes, such as a heating mode and a cooling mode, based on the input signals. The processor 330 may a microprocessor. The processor 330 is also configured to generate a PWM signal that is employed to control a device of the HVAC system, such as a circulation fan, and an integration signal that is employed to control the PWM signal. The processor 330 generates the integration signal based on the descriptive data. In one embodiment, the processor 330 generates the integration signal once. In some embodiments, this occurs during installation. In one embodiment, the memory 320 or a portion thereof is part of the processor 330.

The PCSC 340 is configured to receive a PWM signal and an integration signal from the processor 330 and provide a proportional motor control signal based thereon. The PCSC 340 is configured to provide either the PWM signal or a DC voltage signal as the proportional motor control signal based on the integration signal.

The output interface 350 is configured to provide a physical connection between the HVAC controller 300 and components of the HVAC system connected thereto. The output interface 350 can be a conventional interface that is used for the transmission of data from the HVAC controller 300. The output interface 350 can include multiple ports, terminals or connectors for the transmission of data. The ports, terminals or connectors may be conventional receptacles for communicating data via a communications network or HVAC data bus.

In FIG. 3, one connector of the output interface 350, connector 354, is designated to provide the proportional motor control signal, whether PWM or DC, to a motor controller 399. The motor controller 399 can be a controller for a fan motor of the HVAC system, including a circulation fan of the HVAC system, or another type of variable speed motor. Thus, unlike conventional HVAC controllers, the HVAC controller 300 only needs a single connector designated for a particular proportional motor control signal regardless if a PWM or DC control signal is needed. In some embodiments the HVAC system includes multiple motors that could be either type of variable-speed motor. As such, in some embodiments, there may be a PCSC and a designated connector for each such motor controlled by the HVAC controller 300.

FIG. 4 illustrates a schematic diagram of an embodiment of a PCSC 400 according to the principles of the disclosure. The PCSC 400 includes a signal input 410, a control input 420, a signal output 430 and control circuitry 440. The PCSC 400 also includes an input buffer 450 and an output buffer 460.

The signal input 410 is configured to receive a PWM signal via the input buffer 450. The input buffer 450 can be a conventional buffer. The control input 420 is configured to receive an integration signal and the signal output 430 is configured to provide a connection between the PCSC 400 and a connector, such as connector 354 of the output interface 350. The PWM signal and the integration signal can be received from a processor of an HVAC controller, such as a microprocessor. The signal input 410, the control input 420 and the signal output 430 can be conventional terminals employed with integrated circuits.

The control circuitry 440 is connected to the signal input 410, the control input 420 and the signal output 430, and is configured to provide either the PWM signal or a DC signal to the signal output 430 based on the integration signal. The control circuitry 440 includes a resistor 442 connected between the signal input 410 and the signal output 420. The control circuitry 440 also includes an integration node 444 connected between the resistor 442 and the signal output 430. The control circuitry 440 further includes a switch 446 connected to ground and a capacitor 448 connected between the switch 446 and the integration node 444. The switch 446 can be a FET. The switch 446 is connected to the control input 420 and is operated based on the integration signal. If the voltage of the integration signal is sufficient to turn-on the switch 446 (i.e., integration signal is "on") then the switch 446 provides continuity to ground. If the voltage of the integration signal is such that the switch 446 is off (i.e., integration signal is "off") then the switch 446 provides substantial resistance, e.g., approximately infinite resistance. The capacitor 448 and the resistor 442 provide an integration function to the received PWM signal when the integration signal is "on." As such, when the integration signal is "on," the resistor 442 and the capacitor 448 operate as a low pass filter.

In one embodiment, the control circuitry 440 provides the DC signal when the integration signal is "on" and the PWM signal when the integration signal is "off." The desired proportional motor control signal is presented to the motor controller via the connector. If the proportional motor control signal is a DC signal, a PWM frequency is chosen. In one embodiment, the PWM frequency is determined by the requirements of the connecting device that receives the proportional motor control signal. The desired frequency can be saved as descriptive data in a data reservoir or memory as disclosed herein, and used as needed to configure a signal generator. In one embodiment, the signal generator is a PWM generator of a processor such as the processor 230 or 330 disclosed herein. The value of capacitor 448 is chosen to filter ripple of frequencies supported by the signal generator to provide tolerable ripple on the charge voltage on the capacitor 448. The average voltage is determined by the duty cycle of the PWM signal. The output buffer 460 forwards the DC signal to the motor controller via the connector. The output buffer 460 can be a unity gain impedance buffer. The type and size of the various components of the control circuitry 440 can vary based on the PWM signal received. The values of the resistor 442 and the capacitor 448 are selected to provide a low pass filter adequate to filter frequencies supported by the signal generator.

In the illustrated embodiment, a voltage level of the DC signal is determined by a duty cycle of the PWM signal received at the signal input 410. Three different duty cycles are illustrated in FIG. 4 for the PWM signal: twenty five percent, fifty percent and seventy five percent. Considering, for example, a voltage range of zero to ten volts for the proportional motor control signal, then the twenty five percent duty cycle would provide a 2.5 VDC proportional motor control signal. Additionally, the fifty percent duty cycle would provide a 5.0 VDC proportional motor control signal and the seventy five percent duty cycle would provide a proportional motor control signal of 7.5 VDC.

Those skilled in the art to which this application relates will appreciate that other and further additions, deletions, substitutions and modifications may be made to the described embodiments.

The invention claimed is:
1. A controller for a heating, ventilating and air conditioning (HVAC) system of an enclosed space, comprising:
 a proportional control signal circuit (PCSC), wherein the PCSC is configured to:
  receive a pulse width modulated signal;
  receive an integration signal;
  provide, via an output connected to the PCSC, a proportional motor control signal for a motor based on the integration signal and the pulse width modulated signal;
  wherein the PCSC provides, via the output connected to the PCSC, a direct current (DC) signal if it is determined that a voltage of the integration signal is sufficient to turn-on a switch of the PCSC;
  wherein the PCSC provides, via the output connected to the PCSC, the pulse width modulated signal if it is determined that the voltage of the integration signal is insufficient to turn-on the switch of the PCSC; and wherein the output is a single connection terminal for the pulse width modulated signal or the DC signal as the proportional motor control signal.

2. The controller of claim 1, further comprising:
a data reservoir configured to store descriptive data about the HVAC system;
a signal generator configured to provide the pulse width modulated signal to control the motor; and
a signal manager configured to generate the integration signal, based on the descriptive data, to control the pulse width modulated signal.

3. The controller of claim 2, further comprising:
a processor; and
wherein the signal generator is a pulse width modulated generator of the processor.

4. The controller of claim 3, further comprising:
an input interface coupled to the processor and configured to receive environmental data of the enclosed space.

5. The controller of claim 4, wherein the processor is configured to generate the pulse width modulated signal based on the environmental data.

6. The controller of claim 2, wherein a frequency of the pulse width modulated signal is based on the descriptive data.

7. The controller of claim 1, wherein the output connected to the PCSC is configured to provide the proportional motor control signal to the motor.

8. The controller of claim 1, wherein a voltage level of the DC signal is determined by a duty cycle of the pulse width modulated signal.

9. A proportional control signal circuit (PCSC) for operating a motor, comprising:
a first input;
a second input;
an output;
a control circuitry, wherein the control circuitry is coupled to the first input, the second input and the output;
wherein the PCSC is configured to:
receive, at the first input, a pulse width modulated signal;
receive, at the second input, an integration signal;
provide a proportional motor control signal for the motor based on the integration signal and the pulse width modulated signal;
wherein the PCSC provides a direct current (DC) signal if it is determined that a voltage of the integration signal is sufficient to turn-on a switch of the PCSC;
wherein the PCSC provides the pulse width modulated signal if it is determined that the voltage of the integration signal is insufficient to turn-on the switch of the PCSC; and
wherein the output is a single connection terminal for the pulse width modulated signal or the DC signal as the proportional motor control signal.

10. The PCSC of claim 9, wherein a voltage level of the DC signal is determined by a duty cycle of the pulse width modulated signal.

11. The PCSC of claim 9, wherein the control circuitry includes a resistor connected between the first input and the output.

12. The PCSC of claim 9, wherein the first input comprises a signal input.

13. The PCSC of claim 9, wherein the second input comprises a control input.

14. The PCSC of claim 9, wherein the control circuitry is configured to provide either the pulse width modulated signal or the DC signal to the output based on the integration signal.

15. The PCSC of claim 9, wherein the integration signal is based on descriptive data of the motor.

16. The PCSC of claim 15, wherein a frequency of the pulse width modulated signal is based on the descriptive data.

17. The PCSC of claim 9, wherein the control circuitry comprises the switch.

18. The PCSC of claim 17, wherein the switch is connected to the second input and is operated based on the integration signal.

* * * * *